United States Patent
Takao et al.

(10) Patent No.: US 7,254,132 B2
(45) Date of Patent: Aug. 7, 2007

(54) MOBILE COMMUNICATION SYSTEM, MOBILE COMMUNICATION METHOD, WIRELESS BASE STATION, MOBILE STATION, AND PROGRAM

(75) Inventors: Toshiaki Takao, Yokohama (JP); Kobaruto Shimada, Hamamatsu (JP); Narumi Umeda, Yokohama (JP); Hijin Sato, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1046 days.

(21) Appl. No.: 10/135,360

(22) Filed: May 1, 2002

(65) Prior Publication Data

US 2002/0163902 A1    Nov. 7, 2002

(30) Foreign Application Priority Data

May 1, 2001    (JP)    ............................ 2001-134353

(51) Int. Cl.
*H04L 12/28* (2006.01)
(52) U.S. Cl. ....................... 370/390; 370/389; 370/432; 370/475
(58) Field of Classification Search ...................... None
See application file for complete search history.

(56) References Cited

U.S. PATENT DOCUMENTS

| | | | |
|---|---|---|---|
| 5,898,686 A | | 4/1999 | Virgile |
| 6,038,644 A | * | 3/2000 | Irie et al. ...................... 711/141 |
| 6,112,251 A | | 8/2000 | Rijhsinghani |
| 6,144,651 A | | 11/2000 | Rinchiuso et al. |
| 6,741,575 B1 | * | 5/2004 | Zhang et al. ................ 370/329 |
| 6,847,633 B1 | * | 1/2005 | Ryu et al. ..................... 370/352 |
| 2002/0057662 A1 | | 5/2002 | Lim |
| 2002/0191562 A1 | * | 12/2002 | Kumaki et al. .............. 370/331 |

FOREIGN PATENT DOCUMENTS

| | | |
|---|---|---|
| EP | 0 913 965 | 5/1999 |
| EP | 0 998 075 | 5/2000 |
| JP | 2000-32007 | 1/2000 |
| WO | WO 00/13356 | 3/2000 |

OTHER PUBLICATIONS

V. Chikarmane, et al., Mobile Networks and Applications, vol. 3, No. 4, pp. 365-379, XP-008007478 "Multicast Support For Mobile Hosts Using Mobile IP, Design Issues and Proposed Architecture", 1998.

I. Gopal, et al., IEEE, Computer Networking Symposium, pp. 79-81, "Multicasting To Multiple Groups Over Broadcast Channels", Apr. 11-13, 1998.

* cited by examiner

*Primary Examiner*—Duc Ho
(74) *Attorney, Agent, or Firm*—Oblon, Spivak, McClelland, Maier & Neustadt, P.C.

(57) ABSTRACT

In a wireless base station, when a newly provided control unit receives an IP packet from one mobile station (102), it refers to a destination address in control information added to the IP packet (104), and determines whether the IP packet is one to be broadcast or multicast (106). If the value of destination address is at a value indicative of broadcasting or the like defined by IP, the IP packet is copied according to the subnet, and is sent back to a wireless link layer processor with its contents intact (108). Further, the wireless link layer processor is commanded to broadcast the sent-back IP packet in a wireless area and so forth (110), whereby the IP packet can be broadcast into a cell and so forth.

24 Claims, 6 Drawing Sheets

MOBILE COMMUNICATION SYSTEM, MOBILE COMMUNICATION METHOD, WIRELESS BASE STATION, MOBILE STATION, AND PROGRAM

BACKGROUND OF THE INVENTION

1. Field of the Invention

The present invention relates to a mobile communication system, mobile communication methods, a wireless base station, a mobile station, and programs.

2. Related Background Art

Studies have currently been in progress for applying IP (Internet Protocol), which is a network control protocol prevailing in the Internet, to mobile communication systems in view of seamless connections to the Internet in order to achieve multimedia properties in the mobile communication systems and lower the cost of backbone networks. FIG. 5 shows a configurational example of a wireless base station 10 and a mobile station 20 (collectively referring to mobile stations 20A, 20B) in such a mobile communication system 1. As shown in FIG. 5, the wireless base station 10 includes a transmitter/receiver 11, a wireless link layer processor 12, an IP layer processor 13, an AAL (ATM Adaptation Layer) processor 14, and an ATM (Asynchronous Transfer Mode) transmitter/receiver 15. On the other hand, each mobile station 20 includes a transmitter/receiver 21, a wireless link layer processor 22, and an IP layer processor 23.

In the mobile station 20, user data such as visual, audio, and text data are processed by various applications located in an upper layer and then are fed as a data packet into the IP layer processor 23. The IP layer processor 23 carries out the network control defined by the third layer of the OSI (Open Systems Interconnection) reference model, in which IP is widely used as a protocol. Specifically, the IP layer processor 23 adds the IP address of a mobile station (or a computer on the Internet or the like) to communicate with and its own IP address to a packet from an upper layer, so as to newly assemble an IP packet, and sends thus obtained new IP packet to the wireless link layer processor 22. On the network side, a transmission route of the IP packet is selected according to these IP addresses, and the IP packet is sent to the receiving side.

Subsequently, the wireless link layer processor 22 carries out the link control defined by the second layer of the OSI reference model. Specifically, schedule management for transmitting/receiving IP packets, management for assigning wireless resources such as communication bandwidth to each mobile station 20, and other kinds of control specific to mobile communications such as hand-over are carried out between the wireless link layer processor 22 and the wireless link layer processor 12 of the wireless base station 10. To this aim, various kinds of control information are added to the IP packet from the IP layer processor 23, or a layer 2 packet consisting of control information alone is newly assembled, and thus obtained IP packet is sent to the transmitter/receiver 21. The transmitter/receiver 21 is an apparatus for carrying out the control of the first layer of the OSI reference model, and transmits/receives layer 2 packets in wireless areas in synchronization with the transmitter/receiver 11 of the wireless base station 10. IP packets from the wireless base station 10 are successively sent to the transmitter/receiver 21, wireless link layer processor 22, and IP layer processor 23 in the order reverse of that explained above, so as to be restored to visual, audio, and text data and the like in upper layers.

On the other hand, the wireless base station 10 is characterized in that it has a function of carrying out network control such as IP packet transfer according to the IP addresses mentioned above, i.e., so-called router function. In the wireless base station 10, the transmitter/receiver 11 restores a layer 2 packet from radio signals from the mobile station 20, and sends thus restored packet to the wireless link layer processor 12. As mentioned above, this wireless link layer processor 12 carries out link control in synchronization with the wireless link layer processor 22 of the mobile station 20, so as to restore an IP packet from the layer 2 packet, and sends thus restored packet to the IP layer processor 13. The IP layer processor 13 refers to the destination address added to the IP packet and sends the IP packet, by way of the AAL processor 14 and ATM transmitter/receiver 15, to another wireless base station 10 or a backbone network to which Internet networks or networks of other communication providers are connected. The AAL processor 14 is an apparatus for carrying out the control of the second layer of the OSI reference model, whereas the ATM transmitter/receiver 15 is an apparatus for carrying out the control of the first layer of the OSI reference model.

Meanwhile, LAN (Local Area Network) using radio waves unlike the above-mentioned mobile communication system 1 has currently been coming into wide use. FIG. 6 shows a configurational example of such a wireless LAN system 2. A wireless base station 30 is constituted by a transmitter/receiver 31, a bridge 32, and an Ethernet transmitter/receiver 33, among which the bridge 32 includes a wireless LAN MAC (Media Access Control) layer processor 32A, relay 32B, an address table 32C, and an Ethernet MAC layer processor 32D. On the other hand, a mobile station 40 includes a transmitter/receiver 41 and a wireless LAN MAC layer processor 42, and is connected to a computer 50. The wireless LAN system 2 differs from the above-mentioned communication system 1 in that no apparatus for carrying out the processing defined by the third layer of the OSI reference model exists, whereby the IP layer is not terminated. Namely, IP packets are processed transparently in the wireless LAN system 2.

The computer 50 processes images, data, and the like, so as to generate an IP packet, and sends thus generated packet to the mobile station 40. In the mobile station 40, the wireless LAN MAC layer processor 42 adds two MAC addresses indicating a destination and a sender, and other kinds of control information to the IP packet, thereby generating a layer 2 packet. These MAC addresses are addresses for specifying the wireless MAC layer processor 42 in order to carry out the control defined by the second layer of the OSI reference model, and differ from the above-mentioned IP addresses used for the processing of the third layer. In synchronization with the wireless LAN MAC layer processor 32A on the wireless base station 30 side, the wireless LAN MAC layer processor 42 carries out schedule management for transmitting/receiving IP packets, management for assigning wireless resources such as communication bandwidth to each mobile station 40, and other kinds of control.

The layer 2 packet generated by the wireless LAN MAC layer processor 42 is transmitted as a radio signal to the wireless base station 30 by way of the transmitter/receiver 41. The transmitter/receiver 31 of the wireless base station 30 restores the layer 2 packet from the radio signal, and sends thus restored packet to the bridge 32. The wireless LAN MAC layer processor 32A and Ethernet MAC layer processor 32D within the bridge 32 convert their protocols to each other by way of the repeater 32B, thereby transmitting/receiving layer 2 packets. Here, however, the repeater 32B carries out control for discarding layer 2 packets sent from both processors 32A, 32D, i.e., filtering, according to the information of MAC addresses stored in the address table 32C. For carrying out this processing, the repeater 32B always stores into the address table 32C the value of sender's MAC address added to each layer 2 packet together with information indicative of whether the packet comes from the wireless side or backbone LAN side. When the next layer 2 packet arrives, the repeater 32B refers to the address table 32C. If the MAC address indicative of the destination of this packet is stored in the address table 32C, it can be seen whether the address is located on the wireless side or the backbone LAN side.

For preventing unnecessary transmission of packets from occurring, the repeater 32B sends back packets from the wireless side if their destination is located on the wireless side, so as not to send them to the backbone LAN side. When the destination of packets from the backbone LAN side is located on the backbone LAN side, they are discarded. When the sender and destination of a packet are located on sides opposite from each other, the repeater 32B allows the layer 2 packet to pass therethrough. When the corresponding MAC address is not stored in the address table 32C, the repeater allows the layer 2 packet to pass therethrough, and sends it back to the wireless side if it comes from the wireless side. Thereafter, the layer 2 packet fed into the Ethernet MAC layer processor 32D is sent to the backbone LAN by way of the Ethernet transmitter/receiver 33. Known as an example of standards for such a wireless LAN is IEEE 802.11 defined by IEEE (Institute of Electrical and Electronic Engineers) Also, Ethernet is a standard known as IEEE 802.3.

SUMMARY OF THE INVENTION

When one mobile station 20A broadcasts (distributes to an indefinite number of mobile stations and the like) or multicasts (delivers to a definite number of mobile stations and the like) user packets or various kinds of control packets in the above-mentioned conventional mobile communication system 1 of FIG. 5, it adds to the destination address of each IP packet an address indicating that this IP packet is used for broadcasting or multicasting, and then transmits the IP packet to the wireless base station 10. In this case, the IP layer processor 13 in the wireless base station 10 transmits thus sent IP packet to the backbone network side. Also, it is necessary for another mobile station 20B located within the same cell to receive this packet.

In mobile communication systems such as cellular phones, one cell has a large area, whereas many obstacles exist, so that a line of sight is hard to attain between mobile stations 20, whereby it is difficult for the packet transmitted from one mobile station 20A to be directly received by another mobile station 20B. Therefore, the conventional mobile communication system may be problematic in that IP packets for broadcasting or multicasting cannot be received by another mobile station 20B located within the same cell.

On the other hand, currently prevailing IPv4 (Internet Protocol version 4) has a function of adding to an IP packet an integer value of at least 1, known as TTL (Time to Live), for restricting the distance of propagation of the IP packets. IPv6, which is a newer version, has a function of adding similar control in formation known as Hop Limit. These values are reduced by 1 every time an IP packet passes through a router, and the IP packet is discarded when the values become zero. As a consequence, when a certain terminal addresses an IP packet to all the terminals connected with the same router of said terminal, it is necessary for the IP packet to be sent with its TTL set to 1. Though this IP packet reaches terminals continuously connected to this network, TTL becomes 1 in the router, whereby the packet is discarded there without reaching routers beyond the router. Therefore, the packet can be delivered to only the terminals under the control of the same router.

If similar control is carried out by the conventional mobile communication system, an IP packet whose TTL=1 transmitted from a mobile station is discarded at the time when it reaches the wireless base station. Therefore, even when the IP packet is to be sent back from the wireless base station by using the router function installed in the wireless base station, so as to deliver the IP packet again into the same cell, the IP packet is discarded beforehand, which causes a problem that this IP packet does not reach the aimed mobile station 2. This may further cause a problem that, when one mobile station transmits an IP packet to another mobile station within the same cell alone (which is known as unicast), it fails to reach this mobile station due to the same reason as that mentioned above.

For overcoming the problems mentioned above, functions of the bridge 32 installed in the wireless base station 30 of the above-mentioned wireless LAN system 2 in FIG. 6 may be added to the mobile communication system. This makes it possible to determine broadcasting or multicasting according to the sender's MAC address, and send back IP packets to the wireless side when necessary.

In an IP network, however, IP addresses are utilized in order to indicate that IP packets are used for multicasting, and specify a group formed by destination mobile stations and the like. Therefore, in order to send back IP packets to the wireless side by using functions of the bridge, it is necessary to replace MAC addresses with the information of IP addresses.

However, according to a standard defining this method of conversion (S. Deering, "Host Extensions for IP Multicasting", IETF RFC1112, August 1989), only the low-order 23 bits in the part low-order 28 bits indicating the destination group of multicasting in an IP address (composed of 32 bits in total) replace the low-order 23 bits of an MAC address (composed of 48 bits in total). Then, the remaining bits are set to a value indicative of multicasting. As a consequence, two IP addresses which differ from each other only in their high-order 5 bits in significant 28 bits indicative of the destination group for multicasting become the same MAC address when turned into MAC addresses, whereby they are regarded as the same group in spite of the fact that they belong to different multicasting destination groups. Therefore, simply adding a bridge function of referring to MAC addresses may cause a problem that IP packets reach unintended multicasting destination groups.

In order to overcome the above-mentioned problems, it is an object of the present invention to provide a mobile communication system, mobile communication methods, a wireless base station, a mobile station, and programs which make it possible to transmit IP packets into a cell even when IP is used as a network control protocol, whereby IP packets can be prevented from reaching unintended multicasting destination groups.

In order to achieve the above-mentioned object, the present invention provides a mobile communication system comprising a wireless base station and a mobile station which are adaptable to a network control protocol operating on the Internet; wherein the mobile station comprises adding means for adding ID information for indicating that broadcasting or multicasting should be carried out to control information of a packet to be transmitted to the wireless base station, and mobile station transmitting/receiving means for wirelessly transmitting/receiving a packet to/from the wireless base station including transmission of the packet in which the ID information is added to the control information by the adding means; and wherein the wireless base station comprises first determining means for determining whether or not the packet is one to be broadcast or multicast according to the ID information added to the control information of the packet from the mobile station, copying means for copying the packet according to a subnet to be transmitted when the packet is determined by the first determining means to be one to be broadcast or multicast, and base station transmitting/receiving means for wirelessly broadcasting or multicasting the packet to a mobile station within a cell of a wireless base station corresponding to the subnet.

The present invention provides a mobile communication method in a mobile communication system comprising a wireless base station and a mobile station which are adaptable to a network control protocol operating on the Internet, the method comprising an adding step in which the mobile station adds ID information for indicating that broadcasting or multicasting should be carried out to control information of a packet to be transmitted to the wireless base station; a transmitting step in which the mobile station wirelessly transmits the packet in which the ID information is added to the control information in the adding step to the wireless station; a receiving step in which the wireless base station receives the packet from the mobile station; a first determining step in which the wireless base station determines whether or not the packet received in the receiving step is one to be broadcast or multicast according to the ID information added to the control information of the packet; a copying step in which the wireless base station copies the packet according to a subnet to be transmitted when the packet is determined in the first determining step to be one to be broadcast or multicast; and a wide-area transmitting step in which the wireless base station wirelessly broadcasts or multicasts the packet to a mobile station within a cell of a wireless base station corresponding to the subnet.

The present invention provides a wireless base station, adaptable to a network control protocol operating on the Internet, constituting a mobile communication system together with a mobile station, the wireless base station comprising first determining means for determining, according to ID information added to control information of a packet from the mobile station, whether or not the packet is one to be broadcast or multicast; copying means for copying the packet according to a subnet to be transmitted when the packet is determined by the first determining means to be one to be broadcast or multicast; and base station transmitting/receiving means for wirelessly broadcasting or multicasting the packet to a mobile station within a cell of a wireless base station corresponding to the subnet.

The present invention provides a mobile communication method in which a wireless base station, adaptable to a network control protocol operating on the Internet, constituting a mobile communication system together with a mobile station communicates with the mobile station, the method comprising a first determining step in which the wireless base station determines, according to ID information added to control information of a packet from the mobile station, whether or not the packet is one to be broadcast or multicast; a copying step in which the wireless base station copies the packet according to a subnet to be transmitted when the packet is determined in the first determining step to be one to be broadcast or multicast; and a base station transmitting/receiving step in which the wireless base station wirelessly broadcasts or multicasts the packet to a mobile station within a cell of a wireless base station corresponding to the subnet.

The present invention provides a mobile station constituting a mobile communication system together with a wireless base station adaptable to a network control protocol operating on the Internet; the mobile station comprising adding means for adding ID information for indicating that broadcasting or multicasting should be carried out to control information of a packet to be transmitted to the wireless base station; and mobile station transmitting/receiving means for wirelessly transmitting/receiving a packet to/from the wireless base station including transmission of the packet in which the ID information is added to the control information by the adding means.

The present invention provides a mobile communication method in which a mobile station constituting a mobile communication system together with a wireless base station adaptable to a network control protocol operating on the Internet communicates with the wireless base station, the method comprising an adding step in which the mobile station adds ID information for indicating that broadcasting or multicasting should be carried out to control information of a packet to be transmitted to the wireless base station; and a mobile station transmitting/receiving step in which the mobile station wirelessly transmits/receives a packet to/from the wireless base station including transmission of the packet in which the ID information is added to the control information in the adding step.

A computer as a hardware resource may be provided with a computer readable medium having program instructions for realizing the mobile communication techniques mentioned above. Namely, the present invention provides a program for causing a computer controlling a wireless base station, adaptable to a network control protocol operating on the Internet, constituting a communication system together with a mobile station to realize a first determining function of determining, according to ID information added to control information of a packet from the mobile station, whether or not the packet is one to be broadcast or multicast; a copying function of copying the packet according to a subnet to be transmitted when the packet is determined by the first determining function to be one to be broadcast or multicast; and a base station transmitting/receiving function of wirelessly broadcasting or multicasting the packet to a mobile station within a cell of a wireless base station corresponding to the subnet.

Also, the present invention provides a computer readable medium having program instructions for causing a computer controlling a mobile station constituting a mobile communication system together with a wireless base station adaptable to a network control protocol operating on the Internet to realize an adding function of adding ID information for indicating that broadcasting or multicasting should be carried out to control information of a packet to be transmitted to the wireless base station; and a mobile station transmitting/receiving function of wirelessly transmitting/receiving a packet to/from the wireless base station including transmission of the packet in which the ID information is added to the control information by the adding function.

The above-mentioned mobile communication system, mobile communication methods, wireless base station, mobile station, and programs in accordance with the present invention are based on the same technical idea, while realizing this technical idea in terms of the mobile communication system, mobile communication method, wireless base station, and mobile station.

Therefore, means for solving the problem in the mobile communication system in accordance with the present invention will be explained in the following, whereas means for solving the problem concerning the mobile communication method, wireless base station, mobile station, and program are based on the same idea.

The mobile communication system in accordance with the present invention includes a wireless base station and a mobile station which are adaptable to a network control protocol operating on the Internet. In the mobile station, adding means adds ID information for indicating that broadcasting or multicasting should be carried out to control information of a packet to be transmitted to the wireless base station, whereas mobile station transmitting/receiving means wirelessly transmits the packet in which the ID information is added to the control information by the adding means to the wireless base station.

In the wireless base station, when the packet from the mobile station is received, the first determining means determines whether or not the packet is one to be broadcast or multicast according to the ID information added to the control information of the packet. When the packet is determined by the first determining means to be one to be broadcast or multicast, copying means copies the packet according to a subnet to be transmitted, and the base station transmitting/receiving means wirelessly broadcasts or multicasts the packet to a mobile station within a cell of a wireless base station corresponding to the subnet. Here, copying the packet is not always carried out by the copying means of the wireless base station having received the packet from the mobile station, but may be carried out by copying means of the wireless base station corresponding to a subnet adjacent to the subnet to be transmitted. This is advantageous in that the amount of network traffic can be reduced.

Therefore, even when IP is used as a network control protocol, broadcasting or multicasting of IP packets into a cell can be carried out, whereby IP packets can be prevented from reaching unintended multicasting destination groups. Here, the IP packets refer to packets transmitted/received by using IP which is a network control protocol prevailing in the Internet.

Preferably, in thus configured mobile communication system in accordance with the present invention, the wireless base station further comprises second determining means for determining whether or not the packet is one to be unicast to another mobile station in the same cell as the former mobile station according to the ID information when the packet is determined by the first determining means not to be one to be broadcast or multicast, whereas the base station transmitting/receiving means is configured such that, when the packet is determined to be one to be unicast to another mobile station within the same cell as the former mobile station, the packet is wirelessly unicast to the latter mobile station.

From the viewpoint of a mobile communication method, it is preferred that the method further comprise a second determining step of determining, when the packet is determined not to be one to be broadcast or multicast in the first determining step, whether or not the packet is one to be unicast to another mobile station within the same cell as the former mobile station; and a single transmitting step of wirelessly unicasting the packet to the latter mobile station within the same cell as the former mobile station when the packet is determined by the wireless base station to be one to be unicast to the latter mobile station in the second determining step.

From the viewpoint of a wireless base station, it is preferred that the wireless base station further comprise second determining means for determining whether or not the packet is one to be unicast to another mobile station in the same cell as the former mobile station when the packet is determined by the first determining means not to be one to be broadcast or multicast; whereas the base station transmitting/receiving means is configured such that, when the packet is determined by the second determining means to be one to be unicast to another mobile station within the same cell as the former mobile station, the packet is wirelessly unicast to the latter mobile station.

According to these configurations, when carrying out unicasting from one mobile station to another mobile station within the same cell, the second determining means determines that the packet is one to be unicast to the latter mobile station in the same cell as the former mobile station, whereas the base station transmitting/receiving means wirelessly unicasts the packet to the latter mobile station. Therefore, even when IP is used as a network control protocol, packets can be unicast from one mobile station to another mobile station within the same cell, whereby IP packets can appropriately be transmitted from one mobile station.

Preferably, in the mobile communication system, the mobile station comprises mobile station determining means for determining, according to control information of a packet from the wireless base station, whether or not the sender of the packet is the same mobile station; and discarding means for discarding the packet when the sender of the packet is determined to be the same mobile station by the mobile station determining means.

From the viewpoint of a mobile communication method, it is preferred that the method further comprise a mobile station determining step of determining in the mobile station, according to control information of a packet from the wireless base station, whether or not the sender of the packet is the same mobile station; and a discarding step of discarding the packet when the sender of the packet is determined to be the same mobile station by the mobile station in the mobile station determining step.

From the viewpoint of a mobile station, it is preferred that the mobile station further comprise mobile station determining means for determining, according to control information of a packet from the wireless base station, whether or not the sender of the packet is the same mobile station; and discarding means for discarding the packet when the sender of the packet is determined to be the same mobile station by the mobile station in the mobile station determining step.

According to these configurations, when broadcasting or multicasting a packet from one mobile station and the like, the packet is discarded by the discarding means if the sender of the packet is determined to be the same mobile station by the mobile station determining means, which saves unnecessary processing such as storing the packet from one mobile station after receiving it by the mobile station, whereby broadcasting or multicasting of IP packets from one mobile station can be carried out appropriately.

Preferably, in the mobile communication system in accordance with the present invention, the wireless base station further comprises third determining means for determining whether or not a mobile station other than a mobile station having transmitted a packet to which ID information indicating that broadcasting or multicasting should be carried out is added exists within a cell of the wireless base station;

and stopping means for stopping broadcasting or multicasting the packet into the cell when it is determined by the third determining means that no mobile station other than the mobile station having transmitted the packet exists within the cell.

From the viewpoint of a mobile communication method, it is preferred that the method further comprise a third determining step of determining in the wireless base station whether or not a mobile station other than a mobile station having transmitted a packet to which ID information indicating that broadcasting or multicasting should be carried out is added exists within a cell of the wireless base station; and a stopping step of stopping broadcasting or multicasting the packet into the cell when it is determined by the wireless base station in the third determining step that no mobile station other than the mobile station having transmitted the packet exists within the cell.

From the viewpoint of a wireless base station, it is preferred that the wireless base station further comprise third determining means for determining whether or not a mobile station other than the mobile station having transmitted the packet to which ID information indicating that broadcasting or multicasting should be carried out is added exists within a cell of the same wireless base station; and stopping means for stopping broadcasting or multicasting the packet into the cell when it is determined by the third determining means that no mobile station other than the mobile station having transmitted the packet exists within the cell.

According to these configurations, when it is determined by the third determining means that no mobile station other than the mobile station (packet-originating mobile station) having transmitted the packet to which ID information indicating that broadcasting or multicasting should be carried out is added exists within a cell of the same wireless base station, the stopping means stops broadcasting or multicasting the packet into the cell. This saves unnecessary processing such as broadcasting or multicasting a packet into the cell in spite of the fact that no mobile station other than the packet-originating mobile station exists within the cell of the wireless base station, whereby IP packets can appropriately be broadcast or multicast from one mobile station.

The packet transmitted/received between the mobile station and the wireless base station in the above-mentioned mobile communication system and mobile communication methods may be either a packet defined by the third layer of the OSI reference model or an IP packet.

When broadcasting or multicasting an IP packet transmitted from a mobile station in accordance with the present invention, as explained in the foregoing, the wireless base station can send back the IP packet after appropriately confirming such a situation, so as to enable broadcasting or multicasting into its own cell, whereby IP packets can be transmitted into the cell even when IP is used as a network control.

Also, when unicasting an IP packet to another mobile station within the same cell, the wireless base station can send back the IP packet after appropriately confirming such a situation as in the case mentioned above, whereby unicasting to the aimed mobile station can be carried out even when IP is used as a network control.

Though the effects mentioned above are also obtained when a bridge function installed in a wireless base station of a conventional LAN system is installed into a conventional mobile communication system, it may cause a new problem that different multicasting address groups may mingle with each other as mentioned above. The present invention has a particular effect of preventing such a problem from occurring.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, an embodiment of the mobile communication system, mobile communication methods, wireless base station, mobile station, and programs in accordance with the present invention will be explained.

Figure 1:
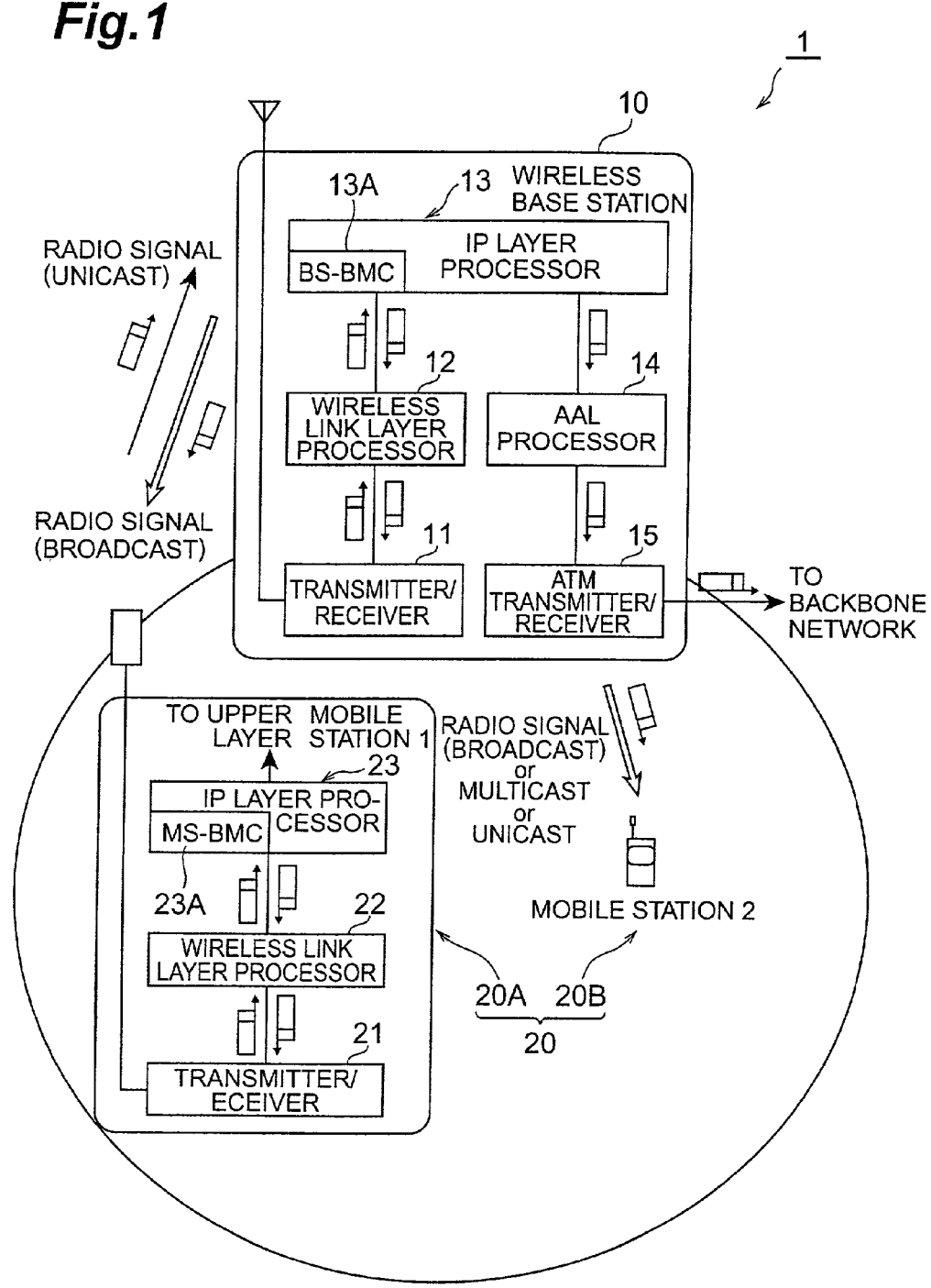
FIG. 1 is a view showing a configurational example of the mobile communication system in accordance with an embodiment of the present invention.

As shown in FIG. 1, a mobile communication system 1 in accordance with the present invention includes a wireless base station 10 and a mobile station 20 (collectively referring to mobile stations 20A, 20B), whereas the wireless base station 10 includes a transmitter/receiver 11, a wireless link layer processor 12, an IP layer processor 13, an AAL (ATM Adaptation Layer) processor 14, and an ATM (Asynchronous Transfer Mode) transmitter/receiver 15. In particular, in this embodiment, a wireless-base-station side broadcasting/multicasting control unit (BS-BMC) 13A is newly added to the wireless side of the IP layer processor 13. On the other hand, the mobile station 20 includes a transmitter/receiver 21, a wireless link layer processor 22, and an IP layer processor 23. In particular, a mobile-station-side broadcasting/multicasting control unit (MS-BMC) 23A is newly added to the receiving side of the IP layer processor 23.

Figure 2:
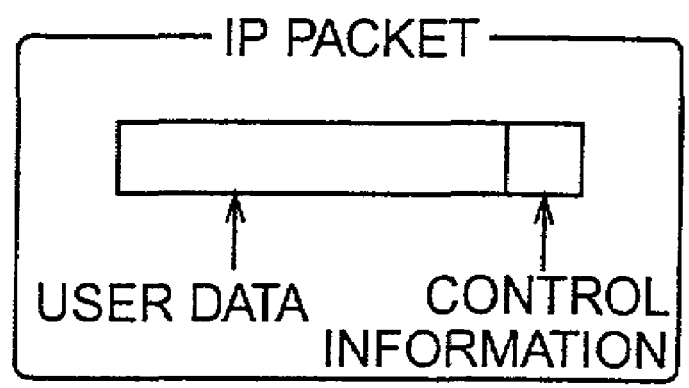
FIG. 2 is a view showing the configuration of an IP packet.

When broadcasting or multicasting user data such as visual, audio, and text data and various kinds of control signals occurring in an IP layer or higher layers, the IP layer processor 23 adds to the IP packet control information of an IP packet including the user data and control signals an ID information indicative of the fact that the IP packet is a packet to be broadcast or multicast. In the mobile station 20, Here, as shown in FIG. 2, an IP packet is constituted by IP packet control information and user data. Here, the above-mentioned ID information is added to the IP packet control information.

Figure 5:
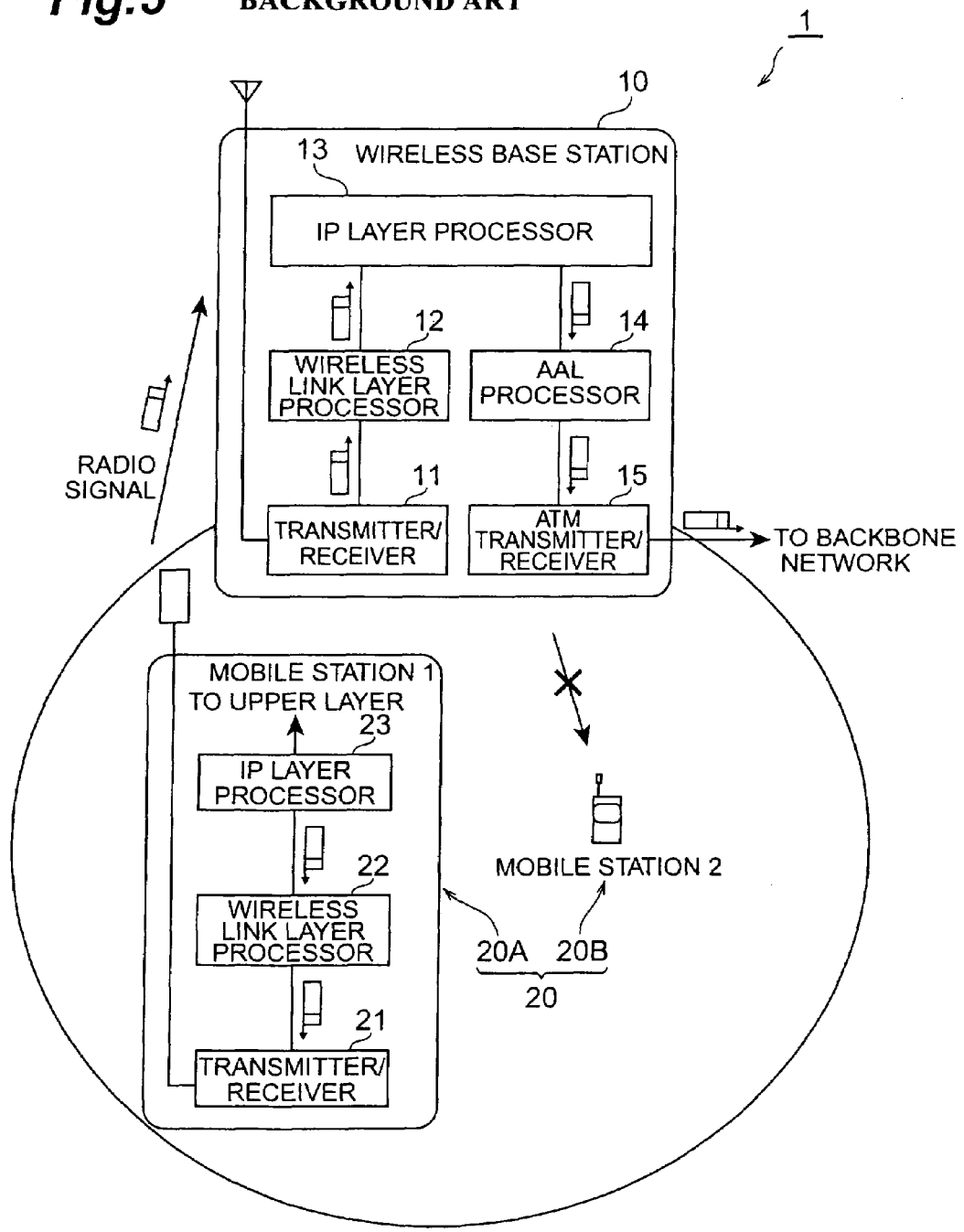
FIG. 5 is a view showing a configurational example of a conventional mobile communication system.
Figure 6:
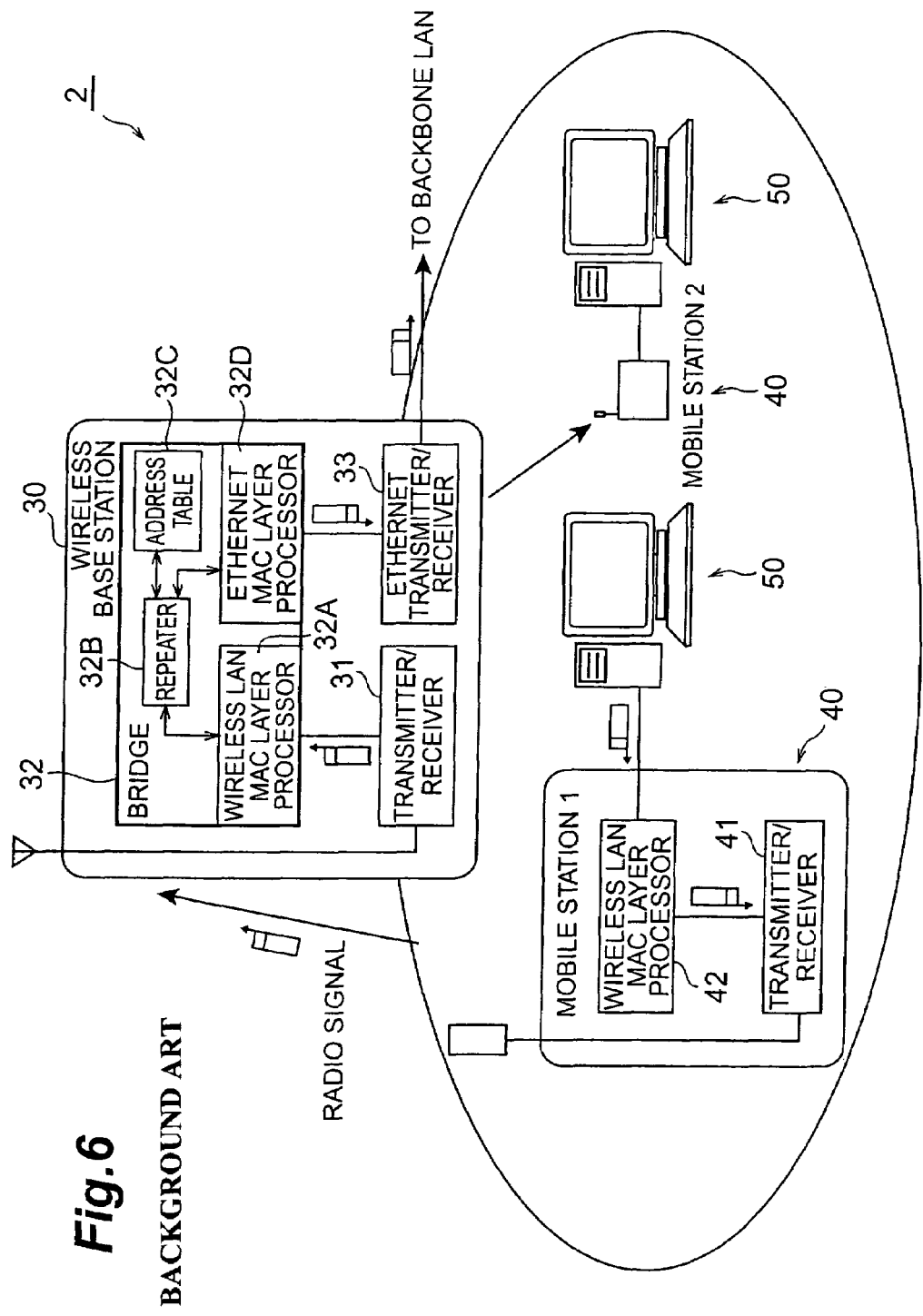
FIG. 6 is a view showing a configurational example of a conventional wireless LAN system.

Then, the IP layer processor 23 sends the IP packet having the above-mentioned IP packet added thereto to the wireless base station 10 by way of the wireless link layer processor 22 and transmitter/receiver 21. The wireless link layer processor 22 and transmitter/receiver 21 carry out operations similar to those in the above-mentioned conventional example (see FIG. 5). As in the conventional example, radio signals from the mobile station 20 are fed as an IP packet into the IP layer processor 13 by way of the transmitter/receiver 11 and wireless link layer processor 12. The IP packet fed into the IP layer processor 13 is initially inputted to the wireless-base-station-side broadcasting/multicasting control unit 13A.

When it is determined that an IP packet is a packet for broadcasting or multicasting, the wireless-base-station-side broadcasting/multicasting control unit 13A copies the IP packet according to a subnet, commands the wireless link layer processor 12 to broadcast the IP packet in a wireless area, and sends back the IP packet.

At the same time, the wireless-base-station-side broadcasting/multicasting control unit 13A sends the IP packet to other parts of the IP layer processor 13 as well. When this IP packet is addressed only to another mobile station 20B within the same cell, the wireless link layer processor 22 is commanded to unicast the IP packet to this mobile station 20B without copying it, and the IP packet is sent back.

The IP packet sent back to the wireless link layer processor 12 is broadcast into the cell or unicast to the mobile station 20B under the control of the wireless link layer processor 12 and transmitter/receiver 11. In the case of broadcasting, it will be sufficient if a transmission channel such as CTCH (Common Traffic Channel), which is a transmission channel for broadcasting and multicasting defined by the second layer of W-CDMA (Wideband-Code Division Multiple Access) system, is used, for example.

On the other hand, the IP packet sent to other parts of the IP layer processor 13 is controlled by the IP layer processor 13 in terms of its route, so as to be sent to a backbone network by way of the AAL processor 14 and ATM transmitter/receiver 15. Here, the AAL processor 14 and ATM transmitter/receiver 15 operate as in the above-mentioned conventional example.

Since the radio signals broadcast from the wireless base station 10 can be received by other mobile stations 20B as well, the IP packet for broadcasting or multicasting sent from one mobile station 20A can be received by another mobile station 20B as well. On the other hand, the IP packet for unicasting addressed to the mobile station 20B can be received by the mobile station 20B.

Radio signals broadcast from the wireless base station 10 are received by one sender mobile station 20A as well, thereby being stored as an IP packet by the transmitter/receiver 21 and wireless link layer processor 22 within the mobile station 20A. However, it is useless to directly input, IP packet is an IP packet sent from the same mobile station thus stored IP packet into the IP layer processor 23 so as to send it to upper layers. Therefore, thus restored IP packet is initially fed into the mobile-station-side broadcasting/multicasting control unit 23A. If the control unit 23A determines that thus fed IP packet is an IP packet sent from the same mobile station, then it discards this IP packet.

The foregoing shows a case of broadcasting or multicasting from the mobile station 20, and a case of unicasting to another mobile station 20 within the same cell.

When an IP packet is sent from the backbone network side, by contrast, the control effected by both broadcasting/multicasting control units 13A, 23A is unnecessary, whereby the configuration is made such that these units 13A, 23B are bypassed.

Operations of the Embodiment

Figure 3:
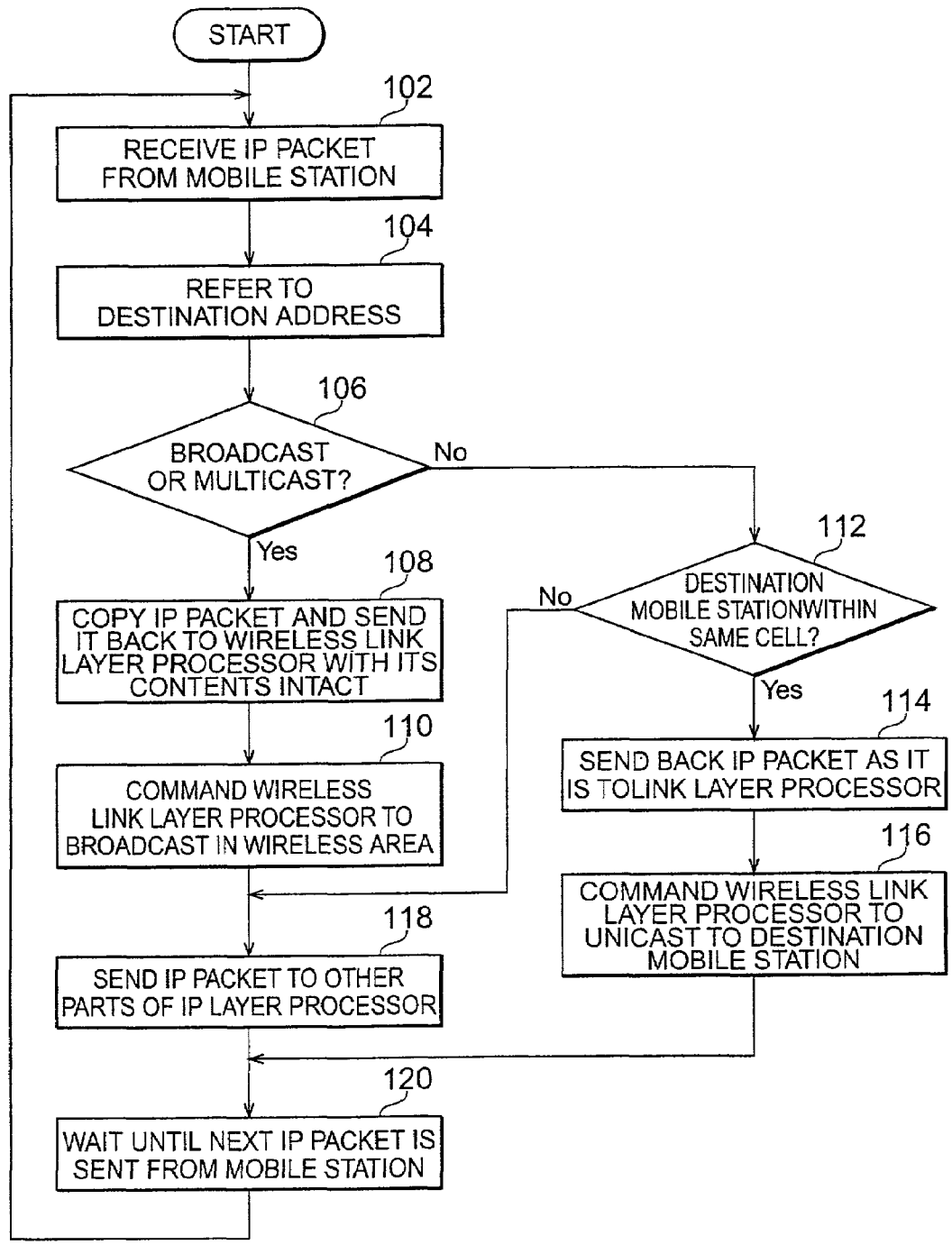
FIG. 3 is a flowchart showing an example of operations of a wireless-base-station-side broadcasting/multicasting control unit.
Figure 4:
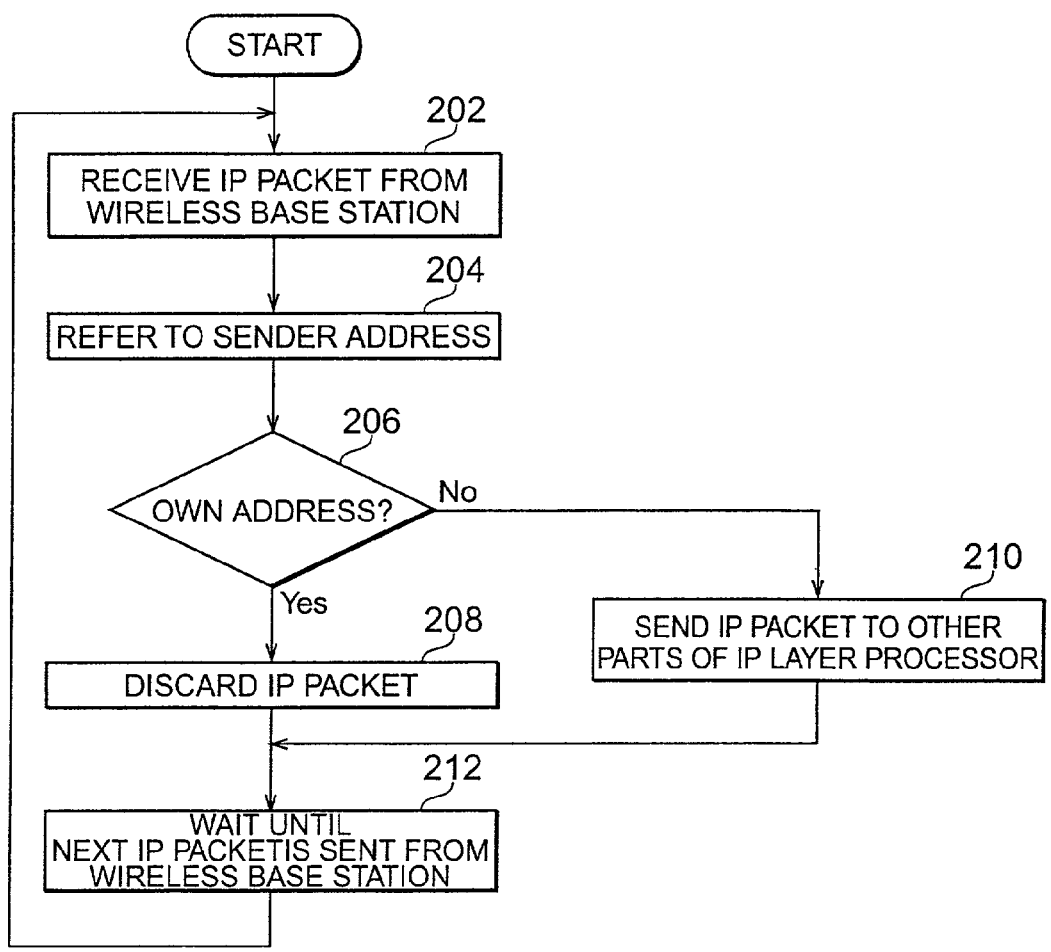
FIG. 4 is a flowchart showing an example of operations of a mobile-station-side broadcasting/multicasting control unit.

Specific operations of the wireless-base-station-side broadcasting/multicasting control unit 13A and mobile-station-side broadcasting/multicasting control unit 23A, which are characteristic points of the present invention, will now be explained with reference to FIGS. 3 and 4. FIGS. 3 and 4 show flowcharts representing an example of operations of the wireless-base-station-side broadcasting/multicasting control unit 13A and an example of operations of the mobile-station-side broadcasting/multicasting control unit 23A, respectively.

First, when the wireless-base-station-side broadcasting/multicasting control unit 13A receives an IP packet from one mobile station 20 by way of the wireless link layer processor 12 and the like (step 102 in FIG. 3), it initially refers to the destination address in the control information added to the IP packet (step 104).

According to this destination address, it is determined whether the IP packet is one to be broadcast or multicast (step 106). Namely, if the value of destination address is one indicative of broadcasting or multicasting defined in IP, then it is determined that the IP packet is one to be broadcast or multicast (step 106; Yes). Subsequently, the IP packet is copied according to a subnet, and is sent back to the wireless link layer processor 12 with its contents intact (step 108). Further, the wireless link layer processor 12 is commanded to broadcast or multicast thus sent-back IP packet in a wireless area (step 110). As a consequence, the IP packet is broadcast or multicast according to the destination address. Thus transmitted IP packet is sent to other parts of the IP layer processor 13 (step 118), and then there is a wait until the next IP packet is received (step 120).

If the value of destination address is not one indicative of broadcasting or multicasting in step 106 (step 106; No), on the other hand, then it is determined whether or not the destination mobile station is a mobile station within the cell of the wireless base station (step 112). If the destination mobile station is a mobile station within the cell of its own (step 112; Yes), then the IP packet is sent back to the wireless link layer processor 12 without copying it (step 114), and the wireless link layer processor 12 is commanded to unicast the IP packet to the mobile station 2 (step 116). Thereafter, there is a wait until the next IP packet is received (step 120).

If the destination mobile station is not one within the own cell in step 112 (step 112; No), by contrast, then the transmitted IP packet is sent to other parts of the IP layer processor 13 (step 118). Thereafter, there is a wait until the next IP packet is received (step 120).

If an IP packet is transmitted from the mobile station 20 during the waiting of step 120, the flow returns to step 102, so as to repeat the processing of step 102 and later.

When the mobile-station-side broadcasting/multicasting control unit 23A receives the IP packet broadcast or multicast by the wireless base station 10 as mentioned above or the unicast IP packet by way of the wireless link layer processor 22 and the like (step 202 in FIG. 4), it initially refers to the sender address in the control information added to the IP packet (step 204).

Subsequently, it is determined whether or not the sender address is at a value indicative of the own mobile station, whereby it is determined whether or not the received IP packet is addressed to the same mobile station (step 206). Namely, if the value of sender address is one indicative of the own mobile station, then it is determined that the received IP packet is addressed to the own mobile station (step 206; Yes), whereby the IP packet is discarded (step 208). This saves unnecessary processing such as receiving and then storing a packet from one mobile station in the same mobile station, whereby an IP packet from one mobile station can be broadcast or multicast appropriately. Thereafter, there is a wait until the next IP packet is received from the wireless base station 10 (step 212).

If the value of sender address is not one indicating the own mobile station, then it is determined that the received IP packet is not addressed to the own station (step 206; No), whereby this IP packet is sent to other parts of the IP layer processor 23 (step 210). Thereafter, there is a wait until the next IP packet is received from the wireless base station 10 (step 212).

If an IP packet is transmitted from the wireless base station 10 during the wait in step 212, then the flow returns to step 202, so as to repeat the processing of step 202 and later.

Due to the foregoing operations of the wireless-base-station-side broadcasting/multicasting control unit 13A and mobile-station-side broadcasting/multicasting control unit 23A newly provided in this embodiment, IP packets can be broadcast or multicast into a cell even when IP is used as a network control protocol, whereby IP packets can be prevented from reaching unintended multicasting destination groups. Also, packets can be unicast from one mobile station to another mobile station within the same cell, whereby IP packets can appropriately be transmitted from one mobile station.

If no mobile station other than the mobile station 20A that is the sender of an IP packet exists within the same cell, it is useless to broadcast the IP packet. Therefore, it is preferred that the wireless link layer processor 12 of the wireless base station 10 be configured so as to determine whether or not there is a mobile station other than the sender mobile station 20A according to the position registration information for identifying where the mobile station 20 is located or linking information and the like when the wireless link layer processor 12 communicates with the mobile station 20 and, if there is none, stop broadcasting the IP packet and discard the sent-back IP packet.

This saves unnecessary processing such as broadcasting or multicasting packets into a cell of the wireless base station in spite of the fact that no mobile station other than the packet-originating mobile station exists within the cell, whereby broadcasting or multicasting of IP packets from one mobile station can be carried out appropriately.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system comprising:
   a wireless base station configured to communicate according to an Internet Protocol (IP) network control protocol operating on the Internet;
   a mobile station configured to communicate according to the IP network control protocol operating on the Internet;
   said mobile station comprises
      an adding section configured to add ID information to existing IP packet control information in a control information of a first IP packet to be transmitted to said wireless base station, said ID information indicating that broadcasting or multicasting should be carried out, and
      a transmitting section configured to wirelessly transmit the first IP packet to said wireless base station; and
   said wireless base station comprises
      a base station receiving section configured to receive the first IP packet from the mobile station,
      a first determining section configured to determine whether a second IP packet should be broadcast or multicast based on the ID information in the first IP packet received from said mobile station,
      a copying section configured to copy said first IP packet to produce the second IP packet according to a subnet to be transmitted when the first determining section determines that the second IP packet should be broadcast or multicast, and
      a base station transmitting section configured to wirelessly broadcast or multicast said second IP packet to a mobile station within a cell corresponding to said subnet.

2. A mobile communication system according to claim 1, wherein said wireless base station further comprises a second determining section configured to determine whether said first IP packet received from said mobile station should be unicast to another mobile station in the same cell as said mobile station when said first determining section determines that the second IP packet should not be broadcast or multicast based on said ID information in said first IP packet,
   wherein said base station transmitting section is further configured to wirelessly unicast said first IP packet to said another mobile station when said second determining section determines that the first IP packet should be unicast to another mobile station within the same cell as said mobile station.

3. A mobile communication system according to claim 1, wherein said mobile station further comprises a mobile station determining section configured to determine whether the sender of said first IP packet is the same mobile station based on the control information in the second IP packet received from said wireless base station; and
   a discarding section configured to discard said second IP packet when said sender of said first IP packet is determined to be the same mobile station by said mobile station determining section.

4. A mobile communication system according to claim 1, wherein said wireless base station further comprises a third determining section configured to determine whether a mobile station other than the mobile station having transmitted the first IP packet exists within a cell of said wireless base station; and
   a stopping section configured to stop broadcasting or multicasting said second IP packet into said cell when it is determined by said third determining section that no mobile station other than said mobile station having transmitted said first IP packet exists within said cell.

5. A mobile communication system according to claim 1, wherein said first and second IP packets are defined by the third layer of the OSI reference model.

6. A mobile communication method in a mobile communication system comprising a wireless base station and a mobile station which are configured to communicate according to an Internet Protocol (IP) network control protocol operating on the Internet, said method comprising:
  adding ID information, by said mobile station, to existing IP packet control information in a control information of a first IP packet to be transmitted to said wireless base station, said ID information indicating that broadcasting or multicasting should be carried out;
  transmitting wirelessly said first IP packet from said mobile station to said wireless base station;
  receiving said first IP packet at said wireless base station from said mobile station;
  first determining, by said wireless base station, whether a second IP packet should be broadcast or multicast based on the ID information in said first IP packet received in said receiving step;
  copying, by said wireless base station, said first IP packet to produce the second IP packet according to a subnet to be transmitted when said first determining step determines that the second IP packet should be broadcast or multicast; and
  wirelessly broadcasting or multicasting said second IP packet from said wireless base station to a mobile station within a cell corresponding to said subnet.

7. A mobile communication method according to claim 6, further comprising:
  second determining whether said first IP packet received at said wireless base station from said mobile station should be unicast to another mobile station within the same cell as said mobile station when said first determining determines that the second IP packet should not be broadcast or multicast based on the ID information in the first IP packet; and
  wirelessly unicasting said first IP packet from said wireless base station to said another mobile station within the same cell as said mobile station when said second determining determines that the first IP packet should be unicast to said another mobile station in said second determining.

8. A mobile communication method according to claim 6, further comprising:
  determining by said mobile station whether the sender of said first IP packet is the same mobile station based on control information in the first IP packet received by said mobile station from said wireless base station; and
  discarding said first IP packet when said determining by said mobile station determines that said sender of said first IP packet is the same mobile station.

9. A mobile communication method according to claim 6, further comprising:
  third determining, by said wireless base station, whether a mobile station other than the mobile station having transmitted the first IP packet exists within a cell of said wireless base station; and
  stopping the broadcasting or multicasting of said second IP packet into said cell when it is determined by said third determining that no mobile station other than said mobile station having transmitted said first IP packet exists within said cell.

10. A mobile communication method according to claim 6, further comprising:
  defining said first and second IP packets according to the third layer of the OSI reference model.

11. A mobile communication method according to claim 6, wherein said first and second IP packets include an IP packet.

12. A wireless base station, configured to communicate with a mobile station in a mobile communication system according to an Internet Protocol (IP) network control protocol operating on the Internet, said wireless base station comprising:
  a base station receiving section configured to receive a first IP packet from the mobile station;
  a first determining section configured to determine whether a second IP packet should be broadcast or multicast based on ID information added to existing IP packet control information in the control information in the first IP packet received from the mobile station;
  a copying section configured to copy said first IP packet to produce the second IP packet according to a subnet to be transmitted when said first determining section determines that the second IP packet should be broadcast or multicast; and
  a base station transmitting section configured to wirelessly broadcast or multicast said second IP packet to a mobile station within a cell corresponding to said subnet.

13. A wireless base station according to claim 12, further comprising a second determining section configured to determine whether said first IP packet received from said mobile station should be unicast to another mobile station in the same cell as said mobile station when said first determining section determines that the second IP packet should not be broadcast or multicast based on said ID information in said first IP packet; and
  said base station is further configured to wirelessly unicast said first IP packet to another mobile station within the same cell as said mobile station when said second determining section determines that the first IP packet should be unicast to said another mobile station.

14. A wireless base station according to claim 12, further comprising a third determining section configured to determine whether a mobile station other than the mobile station having transmitted the first IP packet exists within a cell of said wireless base station; and
  a stopping section configured to stop broadcasting or multicasting said second IP packet into said cell when it is determined by said third determining section that no mobile station other than said mobile station having transmitted said first IP packet exists within said cell.

15. A mobile station configured to communicate with a wireless base station in a mobile communication system according to an Internet Protocol (IP) network control protocol operating on the Internet, said mobile station comprising:
  an adding section configured to add ID information to existing IP packet control information in a control information of a first IP packet to be transmitted to said wireless base station, said ID information indicating that broadcasting or multicasting should be carried out;
  a transmitting section configured to wirelessly transmit the first IP packet to said wireless base station;
  a receiving section configured to receive a received IP packet;
  a mobile station determining section configured to determine whether a sender of said received IP packet is the same mobile station based on control information in the received IP packet; and
  a discarding section configured to discard the received IP packet when the mobile station determining section determines that the sender of the received IP packet is the same mobile station.

16. A mobile communication method in a mobile communication system comprising a wireless base station and a mobile station which are configured to communicate according to an Internet Protocol (IP) network control protocol operating on the Internet, said method comprising:
receiving a first IP packet at said wireless base station;
first determining by said wireless base station whether a second IP packet should be broadcast or multicast based on ID information added to existing IP packet control information in the control information in the first IP packet received from the mobile station;
copying said first IP packet to produce the second IP packet according to a subnet to be transmitted when said first determining determines that the second IP packet should be broadcast or multicast; and
wirelessly broadcasting or multicasting said second IP packet to a mobile station within a cell corresponding to said subnet.

17. A mobile communication method according to claim 16, further comprising:
second determining, by said wireless base station, whether said first IP packet received at said wireless base station should be unicast to another mobile station within the same cell as said mobile station when said first determining determines that the second IP packet should not be broadcast or multicast based on the ID information in the first IP packet; and
wirelessly unicasting said first IP packet from said wireless base station to said another mobile station within the same cell as said mobile station when said second determining determines that the first IP packet should be unicast to said another mobile station in said second determining.

18. A mobile communication method according to claim 16, further comprising:
third determining, by said wireless base station, whether a mobile station other than the mobile station having transmitted the first IP packet exists within a cell of said wireless base station; and
stopping the broadcasting or multicasting of said second IP packet into said cell when it is determined by said third determining that no mobile station other than said mobile station having transmitted said first IP packet exists within said cell.

19. A mobile communication method in a mobile communication system comprising a mobile station and a wireless base station configured to communicate according to an Internet Protocol (IP) network control protocol operating on the Internet, said method comprising:
adding ID information to existing IP packet control information in a control information of a first IP packet to be transmitted to said wireless base station, said ID information indicating that broadcasting or multicasting should be carried out;
wirelessly transmitting the first IP packet to said wireless base station from said mobile station;
receiving a received IP packet;
mobile station determining whether a sender of the received IP packet is the same mobile station based on the control information in the received IP packet; and
discarding said received IP packet when said determining by said mobile station determines that said sender of said first IP packet is the same mobile station.

20. A computer readable medium having program instructions for causing a computer to control a wireless base station, configured to communicate with a mobile station in a communication system according to an Internet Protocol (IP) network control protocol operating on the Internet, said instructions causing the computer to perform steps comprising:
receiving a first IP packet at said wireless base station;
first determining whether a second IP packet should be broadcast or multicast based on ID information added to existing IP packet control information in said first IP packet received in said receiving;
copying said first IP packet to produce the second IP packet according to a subnet to be transmitted when said first determining determines that said second IP packet should be broadcast or multicast; and
wirelessly broadcasting or multicasting said second IP packet from said wireless base station to a mobile station within a cell of a wireless base station corresponding to said subnet.

21. A computer readable medium having program instructions for causing a computer to control a mobile station, configured to communicate with a wireless base station in a mobile communication system according to an Internet Protocol (IP) network control protocol operating on the Internet, said instructions causing the computer to perform steps comprising:
adding ID information, by said mobile station, to existing IP packet control information in a control information of a first IP packet to be transmitted to said wireless base station, said ID information indicating that broadcasting or multicasting should be carried out;
wirelessly transmitting the first IP packet to said wireless base station from said mobile station;
receiving a received IP packet;
mobile station determining whether a sender of the received IP packet is the same mobile station based on the control information in the received IP packet; and
discarding said received IP packet when said determining by said mobile station determines that said sender of said first IP packet is the same mobile station.

22. A mobile communication system comprising:
a wireless base station adaptable configured to communicate according to an Internet Protocol (IP) network control protocol operating on the Internet;
a mobile station configured to communicate according to the IP network control protocol operating on the Internet;
said mobile station comprises
means for adding ID information to existing IP packet control information in a control information of a first IP packet to be transmitted to said wireless base station, said ID information indicating that broadcasting or multicasting should be carried out, and
a transmitting section configured to wirelessly transmit the first IP packet to said wireless base station; and
said wireless base station comprises
a base station receiving section configured to receive the first IP packet from the mobile station,
first means for determining whether a second IP packet should be broadcast or multicast based on the ID information in the first IP packet received from said mobile station,
means for copying said first IP packet to produce the second IP packet according to a subnet to be transmitted when the first means for determining determines that the second IP packet should be broadcast or multicast, and
a base station transmitting section configured to wirelessly broadcast or multicast said second IP packet to a mobile station within a cell corresponding to said subnet.

23. A wireless base station, configured to communicate with a mobile station in a mobile communication system according to an Internet Protocol (IP) network control protocol operating on the Internet, said wireless base station comprising:
- a base station receiving section configured to receive a first IP packet from the mobile station;
- first means for determining whether a second IP packet should be broadcast or multicast based on ID information added to an existing IP packet control information in the control information in the first IP packet received from the mobile station;
- means for copying said first IP packet to produce the second IP packet according to a subnet to be transmitted when said first means for determining determines that the second IP packet should be broadcast or multicast; and
- a base station transmitting section configured to wirelessly broadcast or multicast said second IP packet to a mobile station within a cell corresponding to said subnet.

24. A mobile station configured to communicate with a wireless base station in a mobile communication system according to an Internet Protocol (IP) network control protocol operating on the Internet, said mobile station comprising:
- means for adding ID information to existing IP packet control information in a control information of a packet to be transmitted to said wireless base station, said ID information indicating that broadcasting or multicasting should be carried out;
- a transmitting section configured to wirelessly transmit the packet to said wireless base station;
- a receiving section configured to wirelessly receive a received IP packet;
- means for determining whether a sender of the received IP packet is the same mobile station based on the control information in the received IP packet; and
- means for discarding said received IP packet when said determining determines that said sender of said received IP packet is the same mobile station.

* * * * *